Dec. 1, 1970

3,544,192

SHAPED ENERGY TRANSMISSION ARRAYS

Filed Feb. 29, 1968

INVENTOR.
AMNON GOLDSTEIN

BY Blum, Moscovitz, Friedman Blum & Kaplan
ATTORNEYS

Dec. 1, 1970  A. GOLDSTEIN  3,544,192

SHAPED ENERGY TRANSMISSION ARRAYS

Filed Feb. 29, 1968  2 Sheets-Sheet 2

INVENTOR.
AMNON GOLDSTEIN

BY

Blum, Moscovitz, Friedman, Blum & Kaplan
ATTORNEYS

United States Patent Office 3,544,192
Patented Dec. 1, 1970

3,544,192
SHAPED ENERGY TRANSMISSION ARRAYS
Amnon Goldstein, Forest Hills, N.Y., assignor, by mesne assignments, to Decitron Communication Systems, Inc., Brooklyn, N.Y., a corporation of Delaware
Filed Feb. 29, 1968, Ser. No. 709,474
Int. Cl. G02b 5/16; H01b 7/08
U.S. Cl. 350—96                                                9 Claims

ABSTRACT OF THE DISCLOSURE

A shaped energy transmission array made by forming an energy transmission sheet having a plurality of channels therein, a pair of opposed edges defining a plurality of discrete inputs to said channels and a plurality of discrete outputs from said channels respectively, bending the sheet along a line intermediate the pair of opposed edges so that portions of the sheet are in overlapping relation, shaping the portion of the sheet extending normally from the first of said pair of opposed edges to the desired shape whereby the first edge defines the desired shape, and fixing the conformation of the shaped array. The array may be formed from a plurality of filaments such as electrical conductors or fiber optical filaments aligned in side by side relation so that the pair of opposed edges are defined by the opposed ends of the filaments.

BACKGROUND OF THE INVENTION

This invention relates generally to shaped energy transmission arrays having a plurality of channels therein and a pair of opposed edges thereof defining a plurality of discrete inputs and a plurality of discrete outputs of said channels respectively and to a process for manufacturing such arrays. Shaped energy transmission arrays are utilized wherever it is desired to transmit energy from a plurality of outputs disposed in one configuration to a plurality of inputs disposed in another configuration. One principal type of shaped energy transmission array is formed from a plurality of filaments such as electrical conductors or fiber optical filaments disposed in side by side relation, a pair of edges of the array being defined by the opposed ends of the filaments. For example, filamentary arrays are frequently used in scanning and printing devices incorporated in detectors, facsimile transmission systems, and copying machines. Filamentary arrays formed of electrical conductors are generally required in sequential lined printers and electrostatic printers. Examples of shaped fiber optical arrays are shown in Pats. Nos. 3,325,594 issued on June 13, 1967 to J. S. Goldhammer et al. and 3,104,324 issued on Sept. 17, 1963 to J. Rabinow.

In the past, shaped energy transmission arrays have been expensive to form while the energy transmission characteristics of the discrete energy transmission channels making up the array have varied substantially. Thus, filamentary arrays have frequently been formed by the laborious hand placement of each filament within the array. Another approach, utilized to form fiber optical filamentary arrays is to start with a plurality of fibers of substantially uniform length and conformation, heat the filaments to the drawing temperature thereof and draw the filaments into the desired positions. This approach results in variations in cross-sectional area and length among the various filaments, which in turn results in variations in light transmission characteristics.

SUMMARY OF THE INVENTION

Generally speaking, in accordance with the invention, a shaped energy transmission array is formed from an energy transmission sheet having a plurality of energy transmission channels therein and a pair of opposed edges defining a plurality of discrete inputs and a plurality of discrete outputs of said channels respectively, said sheet being bent along a line intermediate said pair of opposed edges so that portions of said sheet are in overlapping relation, the portion of said array extending normally from the first of said pair of opposed edges being shaped so that said edge defines the desired shape. The array may be formed of a plurality of filaments aligned in side by side relation so that the pair of opposed edges is defined by the opposed ends of the filaments. Filamentary arrays may be formed from a plurality of electrical conductors or a plurality of fiber optical filaments. The shaped edge may be disposed in the shape of a circle or of an information imparting symbol. The other edge of the array may be disposed in a line or, when the sheet forming the array is folded at least twice intermediate the pair of opposed edges, the other edge may also be disposed in a desired shape.

The shaped energy transmission array is manufactured by forming a sheet having a plurality of channels therein and a pair of opposed edges defining a plurality of discrete inputs and a plurality of discrete outputs of said channels respectively, bending the sheet along a line intermediate the pair of opposed edges so that portions of the sheet are in overlapping relation, shaping the portion of the bent sheet extending normally from the first of the pair of opposed edges to the desired shape whereby the first edge defines the desired shape, and fixing the conformation of the shaped array.

Accordingly, it is an object of this invention to provide a simple and inexpensive process for manufacturing shaped energy transmission arrays.

Another object of the invention is to provide a shaped energy transmission array, one edge of which may be disposed in the shape of any of a plurality of information imparting symbols.

A further object of the invention is to provide a shaped filamentary energy transmission array which provides substantially uniform energy transmission characteristics between a plurality of discrete inputs and a plurality of corresponding discrete outputs.

Still another object of the invention is to provide a shaped energy transmission array which will permit transfer of energy between a plurality of discrete outputs disposed in one configuration and a plurality of corresponding inputs disposed in a second configuration.

Another object of the invention is to provide a shaped filamentary energy transmission array wherein each of the filaments making up the array is of substantially uniform length and conformation.

A further object of the invention is to provide a shaped energy transmission array for interconnection between a plurality of discrete outputs disposed in one plane and a plurality of corresponding discrete inputs disposed in a second plane.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
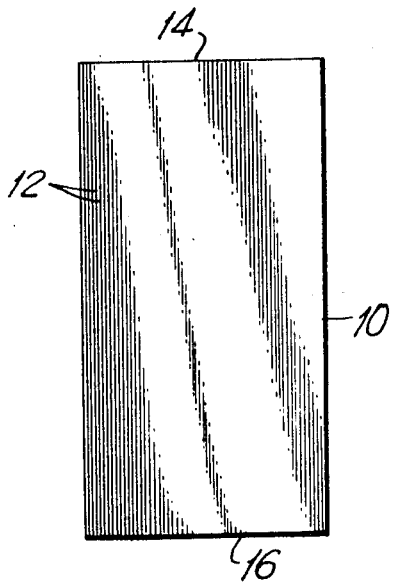
FIG. 1 is a plan view of a filamentary energy transmission sheet from which a shaped energy transmission array in accordance with the invention may be formed.

Referring now more particularly to FIG. 1 of the drawings, the energy transmission sheet 10 comprises a plurality of energy transmission channels which are defined, in the embodiment of the invention pictured in the drawings, by a plurality of energy transmission filaments 12 aligned in side by side relation and secured together to form sheet 10. The pair of opposed edges 14 and 16 of sheet 10 are defined by the terminals of the plurality of energy transmission channels making up the sheet. Thus, in the embodiment shown in the drawings, edges 14 and 16 are defined by the opposed ends of filaments 12. Edge 14 may define the input to sheet 10 and to the plurality of energy transmission channels therein while edge 16 may define the output or vice versa.

Figure 2:
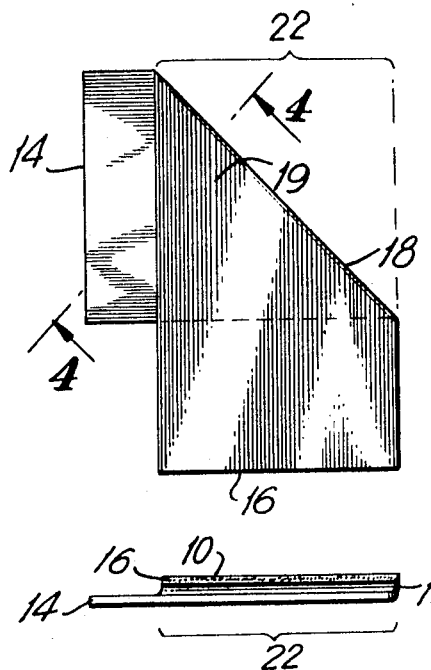
FIG. 2 is a plan view of the filamentary energy transmission sheet of FIG. 1 after bending.
Figure 3:
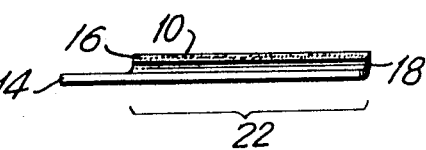
FIG. 3 is an end view of the bent sheet of FIG. 2.
Figure 5:
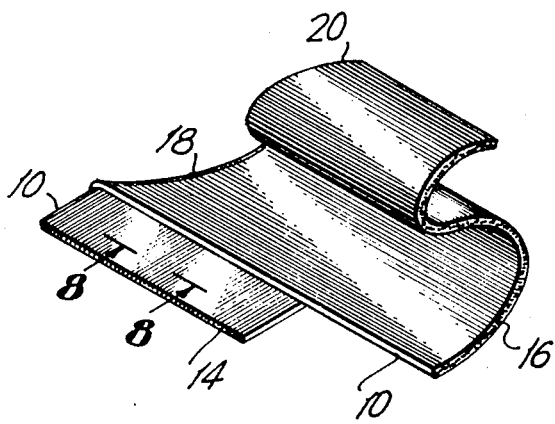
FIGS. 5 and 6 are perspective views of two embodiments of the shaped energy transmission filamentary array in accordance with the invention.

To form the shaped energy transmission array according to the invention, sheet 10 is bent along line 18 intermediate edges 14 and 16 as shown in FIGS. 2 and 3, so that portions 19 of sheet 10 are in overlapping relation. Shaped energy transmission array 20, shown in FIG. 5 is formed from the bent sheet 10 by shaping the portion of said bent sheet extending normally from edge 16 to the desired shape so that edge 16 defines the desired shape, an S in the example of FIG. 5. Sheet 10 is bent and a portion thereof shaped so that each of the discrete energy transmission channels making up the sheet remain intact and edges 14 and 16 are defined by the terminals of the channels and define the terminals of the shaped array 20.

Shaped energy transmission arrays are frequently utilized to transmit energy from a plurality of outputs disposed in a particular configuration in a single plane to a plurality of corresponding inputs disposed in a different configuration in a second plane. In such a case, it is necessary to provide a shaped energy transmission array having one edge, defining the input to said array, disposed in a single plane and shaped to correspond to the disposition of outputs to which it is to be connected. In like manner, the edge of the shaped array defining the output of the array should be configured and disposed in a plane whereby it will operatively connect with the above mentioned input.

One principal advantage of the shaped energy transmission array according to the invention over the known shaped energy transmission arrays is that each of the edges 14 and 16 may be disposed in a single plane without altering the length or conformation of the individual energy transmission channels. This result may be achieved because the folding of the sheet 10 before shaping permits the shaping, as a unit, of the entire portion of bent sheet 10 extending normally from edge 16. The portion of bent sheet 10 shaped as a unit is indicated by brackets 22 in FIGS. 2 and 3. In the preferred embodiment, sheet 10 is bent so that edges 14 and 16 extend beyond overlapping portion 19 of sheet 10, so that the folding of portion 22 as a unit does not disturb the configuration and disposition of edge 14. Accordingly, by bending sheet 10 so that edges 14 and 16 extend beyond the overlapping portion, and by shaping portion 22 as a unit, a shaped array having input and output edges each lying in a single plane is provided.

Edge 16 of shaped energy transmission array 20 of FIG. 5 is disposed in the shape of an S. This is intended merely by way of example, edge 16 and the portion extending normally therefrom, being shapeable in any of a plurality of desired configurations including but not limited to letters of the alphabet and numbers 0 through 9. Edge 14 of shaped array 20 is disposed in a straight line. If desired, edge 14 and the portion of bent sheet 10 extending normally therefrom could be shaped and edge 16 disposed in a straight line.

Figure 6:
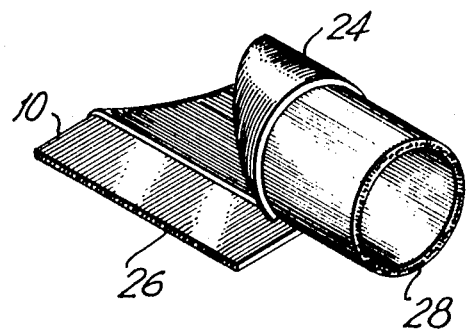
Figure 12:
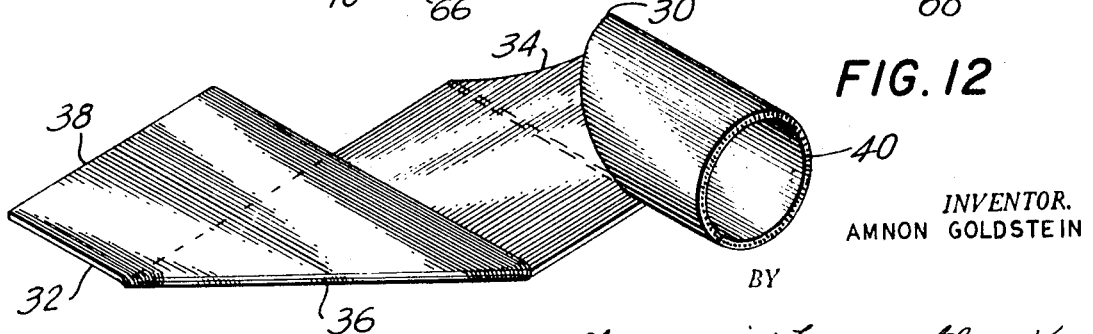
FIG. 12 is a perspective view of a further embodiment of the shaped energy transmission array in accordance with the invention.

One extremely common shaped energy transmission array is the circle to line array 24 of FIG. 6. Edge 26 of array 24 is disposed in a line while edge 28 is disposed in a circle. The circular shape is particularly adapted for scanning by a rotating scanner. Still another embodiment of the shaped energy transmission array according to the invention is shown in FIG. 12. Shaped array 30 is formed from an energy transmission sheet 32 which is bent twice along lines 34 and 36 respectively. The array is also disposed in the circle to line configuration, the terminals of the energy transmission channels making up the array being defined by edges 38 and 40. The portion of bent sheet 32 extending normally from edge 40 is shaped, as a unit, so that edge 40 defines a circle. As shown, edge 38 is disposed in a straight line, but it is clear that the portion of bent sheet 32 extending normally from edge 38 may be shaped in the manner described above to the desired shape without interfering with the disposition of the portion extending normally from edge 40. This lack of interference is insured if the portion of sheet 32 extending normally from edge 38 is independent from and does not include any of the portions of sheet 32 extending normally from edge 40.

Referring again to FIG. 2, line 18, along which sheet 10 is bent, defines an angle of about 45 degrees with edge 16. By varying this angle, the angle between edges 14 and 16 can be varied. This in turn results in variations in the angle between the planes in which edges 14 and 16 of shaped array 20 lie. In the embodiments of FIGS. 5 and 6, edges 14 and 16 lie in planes normal to each other. On the other hand, in the embodiment of FIG. 12, edges 38 and 40 lie in parallel planes. Accordingly, it can be seen that the shaped array according to the invention is extremely flexible in that it can be disposed between inputs and outputs lying in a wide range of planes. The embodiment shown in FIG. 12 offers greater flexibility in this regard since the disposition of both bent lines 34 and 36 may be varied.

Figure 4:
FIG. 4 is a sectional view taken along line 4—4 of FIG. 2.

Referring now to FIG. 4, it is seen that the bend of the preferred embodiment is gradual and substantially arcuate. This arrangement is necessary where sharp discontinuities in the energy transmission channels, as would be occasioned by a sharp fold, would adversely affect the energy transmission characteristics of the array. This is particularly true in the case of energy transmission sheets formed from a plurality of fiber optical filaments which would be damaged by a sharp fold. Further, the gradual bend permits the spacing of overlapping sections 19. This spacing is particularly important where the energy transmission sheet is formed from electrical conductors in order to avoid cross-talk. Means may be provided in the array to maintain overlapping portions 19 in spaced relation if the array is formed from a plurality of electrical conductors.

The energy transmission sheet 10 may be formed from a variety of materials provided the sheet contains a plurality of energy transmission channels, a pair of opposed edges of said sheet being defined by the discrete terminals of said channels. Thus, a shaped energy transmission array may be formed from a sheet of flexible circuitry. A more common type of shaped array would be formed from a plurality of energy transmitting filaments such as electrical conductors and fiber optical filaments. Each filament may serve as a single channel, the ends of the filaments serving as the terminals of the channel. The filaments making up the energy transmission sheet are disposed in side by side relation so that one pair of opposed edges of the sheet are defined by the opposed ends of the filaments.

Each channel of the shaped energy transmission array according to the invention may be able to transmit energy in either direction, as in the case of filamentary arrays formed from electrical conductors or fiber optical filaments or in only one direction as in some flexible circuitry. Some channels, such as those formed from fiber optical filaments can simultaneously transmit energy in both directions. Accordingly, each of the channel terminals defining edges 14 and 16 of array 22 may, depending on the nature of the channel and the desired use, represent either the input, the output or both the input and output of its respective channel. Further, a portion of the terminals defining edge 14 may represent inputs to their respective channels while the balance may represent the output of their respective channels. In like manner, the corresponding terminals of edge 16 would represent outputs and inputs respectively. Accordingly, edge 14 of array 22 may serve as either the input, the output or a combination input and output to the array, as may edge 16.

One process for manufacturing a filamentary energy transmission sheet is to helically wind a single length of filament on a mandrel. Referring to FIG. 1, a cylindrical mandrel or drum 42 is shown upon which a length of energy transmission filament has been helically wound. The windings are secured together by an adhesive tape 46 such as Mylar tape. Flexible resins, R.T.V. Silicon Rubber or the like may also be used to hold adjacent windings of filaments together. The cylinder of filaments formed thereby is cut along line 48 to form a filamentary energy transmission sheet such as the sheet 10 of FIG. 1. Edges 14 and 16 of sheet 10 define the line 48 along which the cylinder was cut while the longitudinal axes of filaments 22 are substantially parallel. If the length of filament wound about the mandrel is of uniform conformation, the filaments making up a filamentary energy transmission sheet manufactured in this manner will be of substantially uniform length and conformation, and therefore have substantially uniform energy transmission characteristics. One advantage of the shaped energy transmission array according to the invention is that the substantially uniform energy transmission characteristics of the sheet is substantially preserved in the array.

Figure 7:
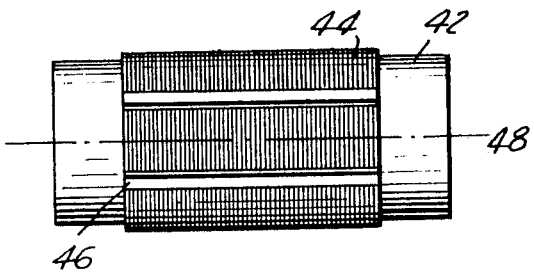
FIG. 7 is a plan view of a mandrel or drum upon which has been wound an energy transmitting filament for use in forming the sheet of FIG. 1.

While FIG. 7 shows a cylindrical mandrel, a filamentary energy transmission sheet may be formed on a mandrel of any shape. If a cylindrical mandrel is used, the length of the sheet will depend upon the diameter of the mandrel. Further, a filamentary energy transmission sheet may be formed by other processes, the process of winding on a mandrel being described by way of example and not limitation.

Figure 8:
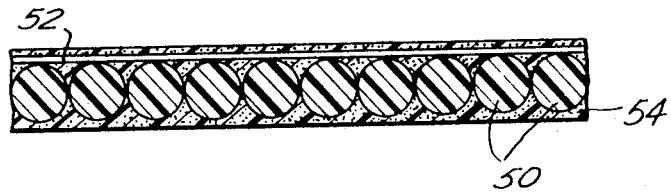
FIGS. 8 through 11 are partial sectional views taken along the line 8—8 of FIG. 5 showing various types of filaments from which the shaped energy transmission filamentary array according to the invention may be formed.
Figure 9:
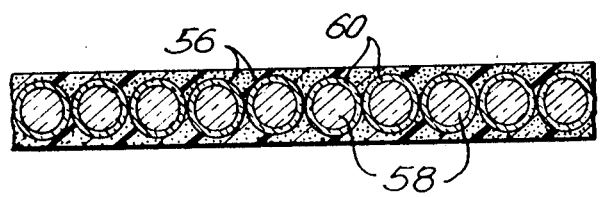
Figure 10:
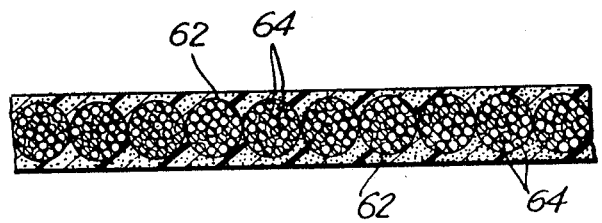

There are two principal types of shaped filamentary array. The first is formed from fiber optical filaments and transmits light energy. FIGS. 8, 9 and 10 show three types of fiber optical filaments which may be utilized in forming filamentary energy transmission arrays. FIG. 8 shows a section of an array formed from plastic filaments 50 which had been temporarily secured together by an adhesive tape 52. After the array had been formed, the array was potted in potting material 54 to maintain the conformation of the array. The filaments 50 may be formed of a polymethyl acrylate such as Lucite or other suitable plastic material. The filaments are preferably coated and/or polished to insure internal reflection of the light being transmitted along the filament. FIG. 9, shows a filament 56 having a core 58 formed from glass having a high refractive index and an outer thin surface layer or coating 60 of glass of a relatively lower refractive index. FIG. 10 shows an array formed from fiber optical filaments 62, each of which is formed from a plurality of smaller fibers 64. Each filament 62 defines a single channel even thought it is itself made up of a plurality of smaller filaments. The above described fiber optical filaments are presented as examples of the types of fiber optical filaments from which shaped energy transmission arrays according to the invention may be formed. Fiber optical filaments of other designs, such as filaments having square cross-sections may be used in forming the shaped energy transmission arrays according to the invention.

Figure 11:
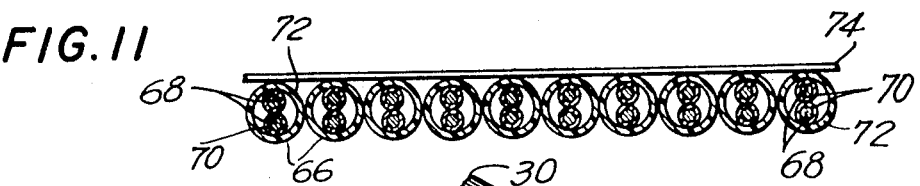

Shaped filamentary energy transmission arrays may also be formed from a variety of types of electrical conductors. One example of such conductors is shown in FIG. 11 wherein the array is formed from insulated two-wire cable 66. Each electrical conductor 68 is surrounded by insulation 70 while the pair of wires making up a single cable are surrounded by further insulation 72. The adjacent cables are secured together by tape 74. In the example of FIG. 11, each cable 66, represents one filamentary energy transmission channel. If other types of electrical conductors are utilized, a channel may be defined, for example, by a single insulated electrical conductor or by a multi-element cable.

Turning now to the process for manufacturing a shaped energy transmission array according to the invention, an energy transmission sheet having a plurality of energy transmission channels therein and a pair of opposed edges defined by the opposed terminals of said channels is formed. A process for forming a filamentary energy transmission sheet is described above. The sheet is then bent along a line intermediate said first pair of opposed edges so that portions of said sheet are in overlapping relation. The portion of the array extending normally from one of said pair of opposed edges is then shaped so that that edge defines the desired shape. The entire portion extending normally from that edge is preferably shaped as a unit. Shaping may be accomplished by hand or through the use of mating dies of the desired shape adapted to receive the portion of the bent sheet to be shaped between them. The array is then fixed in the desired conformation by some fixing means. The fixing means can be a potting material such as an epoxy or can take the form of brackets, or braces shaped as desired and secured to the array. Such brackets could also be utilized to shape the array if desired.

While most of the materials in question can be bent and shaped at room temperature, other materials, such as certain glass fiber optical filaments, are not sufficiently flexible at room temperature and must be heated to a temperature at which they may be manipulated as part of the bending and shaping steps.

By the above described process, a shaped energy transmission array may be formed while substantially preserving uniform energy transmission characteristics among the plurality of discrete channels making up the array. An additional advantage of this method is its simplicity. For example, in the case of electrical conductors, rather than wiring each electrical conductor separately as is the practice now, a sheet of electrical conductors can be formed as described above and this sheet, by simple manipulation, can be converted into a shaped array.

It will thus be seen that the object set forth above, among those made apparent from the preceding description, are efficiently attained and, since certain changes may be made in carrying out the above process and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A shaped energy transmission array having a plurality of energy transmission channels, each of said channels extending between a first and second terminal, comprising an energy transmission sheet having a plurality of said channels extending in substantially parallel relation therein and first and second opposed edges, said first and second edges being defined by said first and second terminals respectively, said sheet being bent along a bend line intermediate said first and second opposed edges so that portions of said sheet are in overlapping relation, the portion of said array extending normally from said first edge to said bend line being shaped as a unit so that said first edge defines a desired shape other than a straight line, and lies in a single plane, the transverse cross section of said array portion between said first edge and said bend line being substantially uniform and substantially defining the desired shape.

2. A shaped energy transmission array as recited in claim 1 wherein said first edge is disposed in the shape of a circle and said second edge is disposed in substantially a straight line.

3. A shaped energy transmission array as recited in claim 1 wherein said bend is substantially arcuate.

4. A shaped energy transmission array as recited in claim 1 wherein said array is formed from a plurality of energy transmission filaments of substantially uniform length aligned in side by side relation, said first and second opposed edges and said first and second terminals being defined by the opposed ends of said filaments.

5. A shaped energy transmission array as recited in claim 4 wherein said energy transmission filaments comprise fiber optical filaments.

6. A shaped energy transmission array as recited in claim 4, wherein said energy transmission filaments comprise insulated electrical conductors.

7. A shaped energy transmission array as recited in claim 6 including means for maintaining said overlapping portions of said sheet in spaced relation.

8. A shaped energy transmission array as recited in claim 1 wherein said sheet has at least one further bend along a second bend line intermediate said first and second opposed edges so that further portions of said sheet are in overlapping relation, said portion of said array extending normally from said first edge to said first-mentioned bend line being out of overlapping relation to the portion of said array extending normally from said second edge to said second bend line, said portions extending respectively from said first and second edges to said first-mentioned and second bend lines respectively, each being shaped as a unit so that said first edge defines a first desired shape other than a straight line and said second edge defines a second desired shape other than a straight line, said first and second edges each being disposed respectively in separate single planes, the transverse cross sections of said array portions intermediate said first edge and first-mentioned bend line and said second edge and said second bend line respectively being substantially uniform and substantially defining the desired shape.

9. A fiber optical shaped transducer comprising a sheet formed from a plurality of fiber optical filaments of substantially uniform length and conformation substantially aligned in substantially parallel relation, said sheet having a pair of opposed edges defined by the opposed ends of said filaments, said sheet being bent along a bend line intermediate said pair of opposed edges so that portions of said sheet are in overlapping relation, said pair of opposed edges extending outside of said overlapping portions, the portion of said array extending normally from one of said pair of opposed edges to said intermediate bend line being shaped as a unit so that said edge defines a desired shape other than a straight line in a single plane, the other of said pair of edges being disposed in a line, and means for maintaining the contour and relative position of said filaments at at least said pair of opposed edges, the transverse cross sections of said array between said first edge and said bend line being substantially uniform and substantially defining said desired shape.

References Cited

UNITED STATES PATENTS

| | | | |
|---|---|---|---|
| 1,533,936 | 4/1925 | Harvey | 174—117.1 X |
| 3,125,013 | 3/1964 | Herrick et al. | 350—96 X |
| 3,164,918 | 1/1965 | Brown | 350—96 X |
| 3,167,612 | 1/1965 | Strickholm | 350—96 X |
| 3,296,365 | 1/1967 | Basile | 174—117.11 |

DAVID H. RUBIN, Primary Examiner

U.S. Cl. X.R.

174—117